United States Patent
Koberstein et al.

(10) Patent No.: US 9,376,099 B2
(45) Date of Patent: Jun. 28, 2016

(54) SMART TRANSMISSION SHIFT DELAY METHOD AND SYSTEM FOR CLIMATE CONTROL FOR A VEHICLE

(71) Applicant: Ford Global Technologies, LLC, Dearborn, MI (US)

(72) Inventors: Manfred Koberstein, Troy, MI (US); Tina Maurer, Troy, MI (US); Stephen R. Dennon, Belleville, MI (US); Ranganathan Madhavan, Canton, MI (US); Jim Rollinson, Superior Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 13/940,928

(22) Filed: Jul. 12, 2013

(65) Prior Publication Data

US 2015/0018172 A1 Jan. 15, 2015

(51) Int. Cl.
*F16H 59/00* (2006.01)
*B60W 10/11* (2012.01)
(Continued)

(52) U.S. Cl.
CPC ............... *B60W 10/11* (2013.01); *B60W 10/06* (2013.01); *B60W 10/30* (2013.01);
(Continued)

(58) Field of Classification Search
CPC . B60W 10/11; B60W 10/06; B60W 2550/12; B60W 10/04; B60W 10/10; B60W 10/30
See application file for complete search history.

(56) References Cited

U.S. PATENT DOCUMENTS

| 6,079,485 A * | 6/2000 | Esaki | B60H 1/00285 165/42 |
| 7,325,595 B2 * | 2/2008 | Homan | B60H 1/004 165/202 |

(Continued)

FOREIGN PATENT DOCUMENTS

| JP | 61054328 | 3/1986 |
| JP | 04185968 | 7/1992 |

(Continued)

OTHER PUBLICATIONS

Rico Baumgart, Peter Tenberge, Reducing the Fuel Consumption by Optimizing the Air Conditioning System, 2010, Purdue University, Purdue e-Pubs, International Refrigeration and Air Conditioning Conference, School of Mechanical Engineering.

*Primary Examiner* — David J Hlavka
(74) *Attorney, Agent, or Firm* — LeClairRyan

(57) ABSTRACT

A method and system for the cancellation of transmission shift delay as a function of an optimum target temperature is disclosed. Once the pre-selected optimum target is achieved, the shift delay is cancelled and the transmission is upshifted. Thus the disclosed inventive concept is based on the cancellation of the shift delay on achieving climate control air conditioning comfort targets. Such comfort targets could include one or more of the measured HVAC evaporator temperature, the HVAC discharge temperature, or the in-vehicle cabin temperatures. When a temperature sensor measuring the selected temperature reaches the pre-selected target temperature the shift delay may be cancelled and the transmission may be upshifted, thus maximizing passenger comfort while minimizing fuel consumption. Having the shift delay based upon the achievement of specific measurable comfort targets in the form of target temperatures rather than on a set time period allows optimization between cabin comfort and fuel efficiency.

20 Claims, 3 Drawing Sheets

(51) Int. Cl.
*B60W 10/06* (2006.01)
*B60W 10/30* (2006.01)
*B60W 30/188* (2012.01)

(52) U.S. Cl.
CPC ...... *B60W 30/1886* (2013.01); *B60W 2550/12* (2013.01); *B60W 2560/00* (2013.01); *B60W 2710/1005* (2013.01); *Y10T 477/653* (2015.01)

(56) References Cited

U.S. PATENT DOCUMENTS

| | | | | |
|---|---|---|---|---|
| 8,047,274 | B2* | 11/2011 | Oomura | B60H 1/004 165/202 |
| 2009/0017984 | A1* | 1/2009 | Shibata | B60K 6/445 477/3 |
| 2009/0227417 | A1* | 9/2009 | Imamura | B60K 6/445 477/5 |
| 2012/0203434 | A1* | 8/2012 | Sujan | B60W 50/14 701/64 |
| 2013/0157806 | A1* | 6/2013 | Koyama | B60W 20/30 477/5 |
| 2014/0128222 | A1* | 5/2014 | Norman | F16H 59/32 477/98 |
| 2014/0297089 | A1* | 10/2014 | Tsuda | B60W 10/115 701/22 |

FOREIGN PATENT DOCUMENTS

| | | |
|---|---|---|
| JP | 2011105191 | 6/2011 |
| KR | 20000026536 | 5/2000 |
| KR | 20100061199 | 6/2010 |

* cited by examiner

SMART TRANSMISSION SHIFT DELAY METHOD AND SYSTEM FOR CLIMATE CONTROL FOR A VEHICLE

TECHNICAL FIELD

The disclosed invention relates generally to vehicle transmission shift delay methods and systems for automotive vehicles. More particularly, the disclosed invention relates to a smart transmission shift delay method and system that bases the cancellation of transmission shift delay on achieving climate control air conditioning comfort targets.

BACKGROUND OF THE INVENTION

The present invention relates in general to transmission shift delay strategies and automotive heating, ventilating, and air conditioning (HVAC) systems. Such systems developed from the passenger's need for thermal comfort which has played an important role in automobile development since the very earliest days of vehicles. Early automobiles were fitted with interior heaters which depended variously on manifold heaters utilizing heated exhaust gases, gasoline-fired heaters, and heated engine coolant circulated through the engine, radiator and passenger compartment heater core.

As consumers demanded more comfort throughout the driving year and in more extreme climates, air conditioning systems were also introduced. Additional optional devices such as heated seats, cooled seats, heated steering wheels, or partitioned climate zones have become available for increasing comfort.

However, all of the air conditioning systems utilize energy and reduce engine performance, particularly at vehicle start up and during low speed drive-away or at speeds of about 50 kph or 30 mph. During vehicle start up and at such low speed drive-away passenger air-conditioned comfort is sometimes compromised while engine power is directed to the vehicle powertrain.

In response to this situation a transmission shift delay has been employed by some vehicle designers. The transmission shift delay is needed to keep engine RPMs high enough and, as a consequence, to maintain adequate revolutions of the clutched compressor to provide suitable air conditioning performance at high ambient temperatures.

The shift delay is usually time-based, timing out after perhaps 15 minutes at 50 kph/30 mph, for example. In some cases, the timed shift delay is not optimized and can be inappropriate in different temperature and road load scenarios, resulting in excessive fuel consumption on the one hand or poor air conditioning performance on the other hand. A more appropriate criterion for delaying transmission upshift is needed for optimizing powertrain performance while meeting customer comfort expectations through the achievement of optimum interior climate conditions.

As in so many areas of vehicle technology there is always room for improvement related to vehicle passenger comfort and fuel economy.

SUMMARY OF THE INVENTION

The disclosed invention overcomes the problems of known systems and methodologies by providing for the cancellation of transmission shift delay as a function of an optimum target temperature as opposed to time as is known in the art. Once the pre-selected optimum target is achieved the shift delay is cancelled and the transmission is upshifted.

The solution of the disclosed inventive concept is to base the cancellation of the shift delay on achieving climate control air conditioning comfort targets. Such comfort targets could include one or more of the measured HVAC evaporator temperature, the HVAC discharge temperature, or the in-vehicle cabin temperatures as measured by appropriate sensors.

When a temperature sensor measuring the selected temperature reaches the pre-selected target temperature the shift delay may be cancelled and the transmission may be upshifted, thus maximizing passenger comfort while minimizing fuel consumption.

Having the shift delay based upon the achievement of specific measurable comfort targets in the form of target temperatures rather than a set time period allows optimization between cabin comfort and fuel efficiency, regardless of factors such as sunload, ambient temperature, wind, or vehicle road load.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
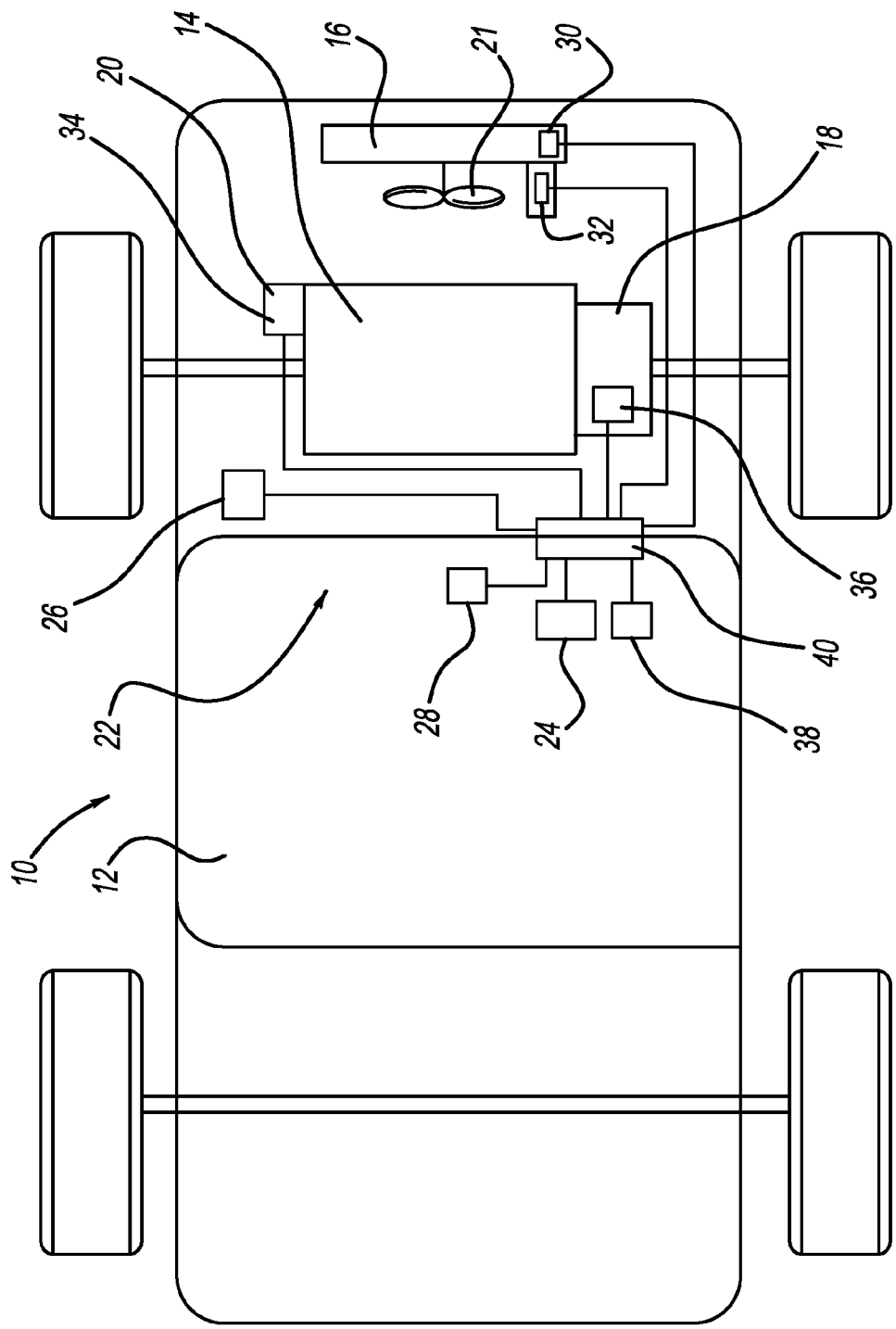
FIG. 1 shows some of the components of the system of the disclosed invention in schematic illustration.

In the following figures, the same reference numerals will be used to refer to the same components. In the following description, various operating parameters and components are described for different constructed embodiments. These specific parameters and components are included as examples and are not meant to be limiting.

Referring to FIG. 1, a vehicle, generally illustrated as 10, is shown in schematic view. The vehicle 10 includes a passenger compartment 12, an engine assembly 14, and an evaporator 16. The engine assembly 14 includes a transmission 18, an air conditioner compressor 20, and a cooling fan 21. It is to be understood that the configuration and arrangement of the passenger compartment 12, the engine assembly 14, the evaporator 16, the transmission 18 and the air conditioner compressor 20 of the vehicle 10 illustrated in FIG. 1 are set forth as non-limiting examples which may be varied without deviating from the spirit and scope of the disclosed inventive concept set forth herein.

The vehicle 10 further includes a smart shift delay control system, generally illustrated as 22. The system 22 includes a plurality of temperature sensors, function sensors, a control module, and a main data bus. More particularly, the system 22 includes a cabin temperature sensor 24 for sensing cabin temperature and an ambient temperature sensor 26 for sensing ambient temperature. The illustrated placements of the cabin temperature sensor 24 and the ambient temperature sensor 26 are only suggested and are again not intended as being limiting.

The system 22 further includes a vehicle status sensor 28 for sensing whether the engine assembly 14 is on or off. In addition, the system 22 includes an HVAC evaporator temperature sensor 30 for sensing evaporator temperature and an HVAC discharge temperature sensor 32 for sensing HVAC discharge temperature.

Associated with both the system 22 and the engine assembly 14 is a compressor RPM sensor 34 that determines the revolutions of the air conditioner compressor 20. Also associated with both the system 22 and the engine assembly 14 is a transmission shift controller 36 that both identifies the selected transmission gear and controls gear selection such that the transmission can be upshifted or a gear change is delayed based on various inputs of the system 22.

The system 22 includes a control module 38. The control module 38 may comprise one or more control modules located throughout vehicle 10.

The control module 38, the cabin temperature sensor 24, the ambient temperature sensor 26, the vehicle status sensor 28, the HVAC evaporator temperature sensor 30, the HVAC discharge temperature sensor 32, the compressor RPM sensor 34, and the transmission shift controller 36 may communicate via a data bus 40. Preferably but not absolutely the data travels over data bus 40 using a Controller Area Network (CAN) protocol. They may alternatively communicate in any other suitable fashion, e.g., hardwire or wireless.

The disclosed inventive concept is directed to the cancellation of the shift delay on achieving preselected climate control air conditioning comfort targets in any suitable manner. Such comfort targets can include, without limitation, the HVAC evaporator temperature, the HVAC discharge temperature, or the in-vehicle cabin temperature as measured by the cabin temperature sensor 24, the HVAC evaporator temperature sensor 30, and the HVAC discharge temperature sensor 32 respectively. The target temperatures may be determined via a look-up table and may be relied upon singularly or in one or more combinations.

One or more of the temperatures sensed by the cabin temperature sensor 24, the HVAC evaporator temperature sensor 30, and the HVAC discharge temperature sensor 32, acting alone or in combination, are received by the control module 38 via the data bus 40. The control module 38 determines the target operating temperature based upon the look-up tables stored therein and, if the target is achieved, instructions are sent from the control module 38 to the transmission shift controller 36 to cancel the shift delay, thus saving fuel.

According to the methodology of the disclosed inventive concept, tying the shift delay to achieving specific measurable comfort targets rather than a set time period allows for an optimal balance between cabin comfort and fuel efficiency. This level of optimal efficiency may be achieved regardless of factors such as sunload, ambient temperature, wind, vehicle road load and the like.

Figure 2:
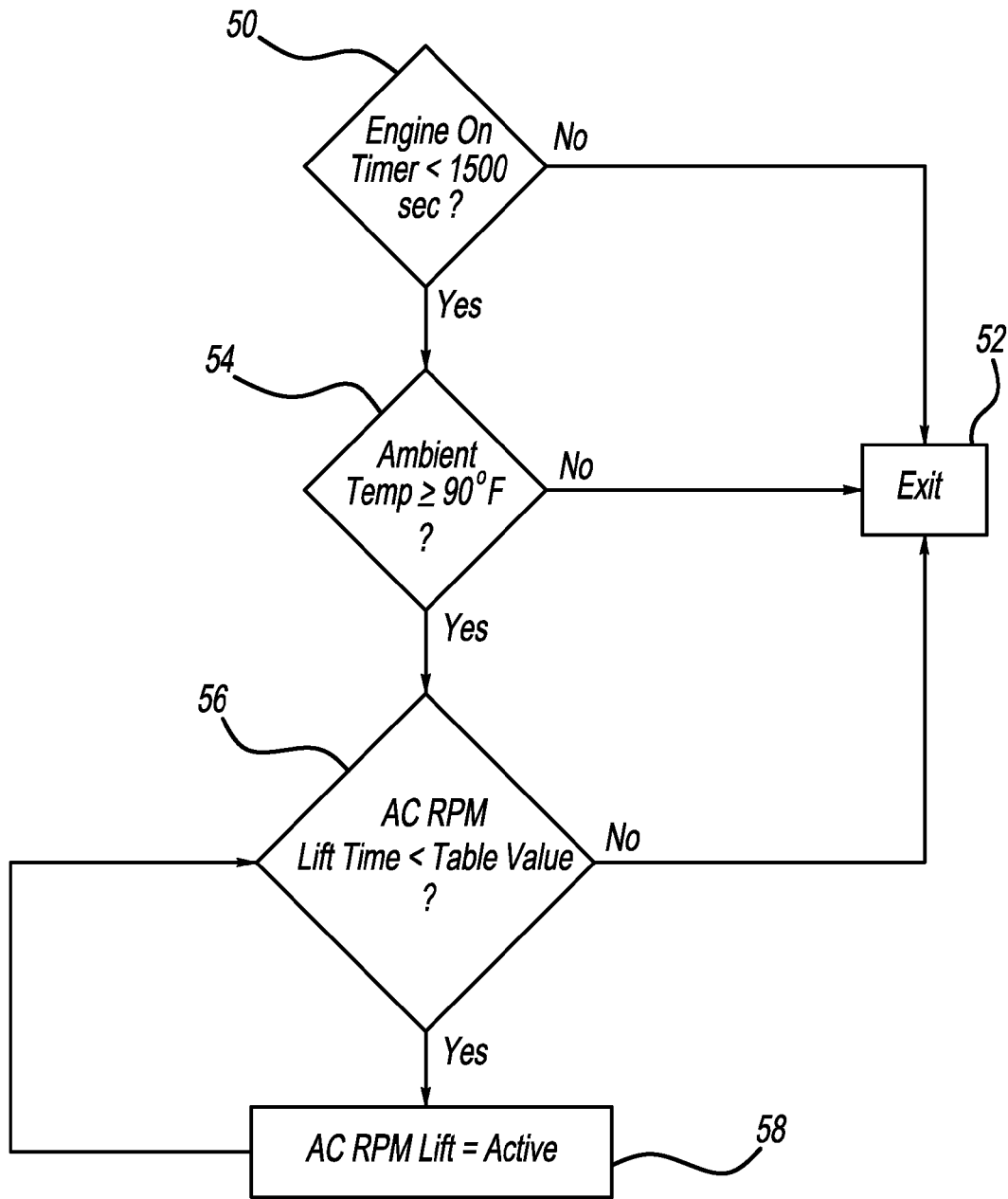
FIG. 2 illustrates a flow chart illustrating operation of the system according to known technology.

Referring to FIG. 2, a methodology for regulating shift delay according to the known art is disclosed. At step 50, an inquiry is made to the vehicle status sensor 28 to determine whether the engine assembly 14 is on or off based, for example, on a time of <1500 seconds. If, upon inquiry, it is determined that the engine assembly 14 is off then the program is exited at step 52.

On the other hand, if, upon inquiry at step 50, it is determined that the engine assembly 14 is on then the program proceeds to the next inquiry at step 54 as to whether or not the ambient temperature is ≥90° F. This determination is made using the ambient temperature sensor 26. If it is found at step 54 that the ambient temperature is not ≥90° F. at step 54 then the program is exited at step 52.

Conversely, if it is found after signaling the ambient temperature sensor 26 that the ambient temperature is ≥90° F. then an inquiry is made of the compressor RPM sensor 34 at step 56 whether or not the air conditioner compressor RPM lift time is < a predetermined value of a look-up table. If it is found at step 56 that the air conditioner compressor RPM lift time is not < the predetermined value of a look-up table at step 56 then the program is exited at step 52.

If it is found at step 56 that the air conditioner compressor RPM lift time is < the predetermined value of the look-up table then the air conditioner compressor RPM lift is made active and the shift delay is cancelled at step 58. The inquiry at step 56 is thereafter repeated until it is determined that the air conditioner compressor RPM lift time is not < the predetermined value of a look-up table at which time the program is exited at step 52.

The time-based shift delay of the prior art disclosed in the methodology of FIG. 2 results in a failure to optimize the delay sequence. The result is inefficient shifting that causes either excessive fuel consumption or poor air conditioning performance.

The methodology of the disclosed inventive concept overcomes the problems presented by the known methodology. Particularly, and with reference to FIG. 3, a methodology of the disclosed inventive concept is illustrated.

Figure 3:
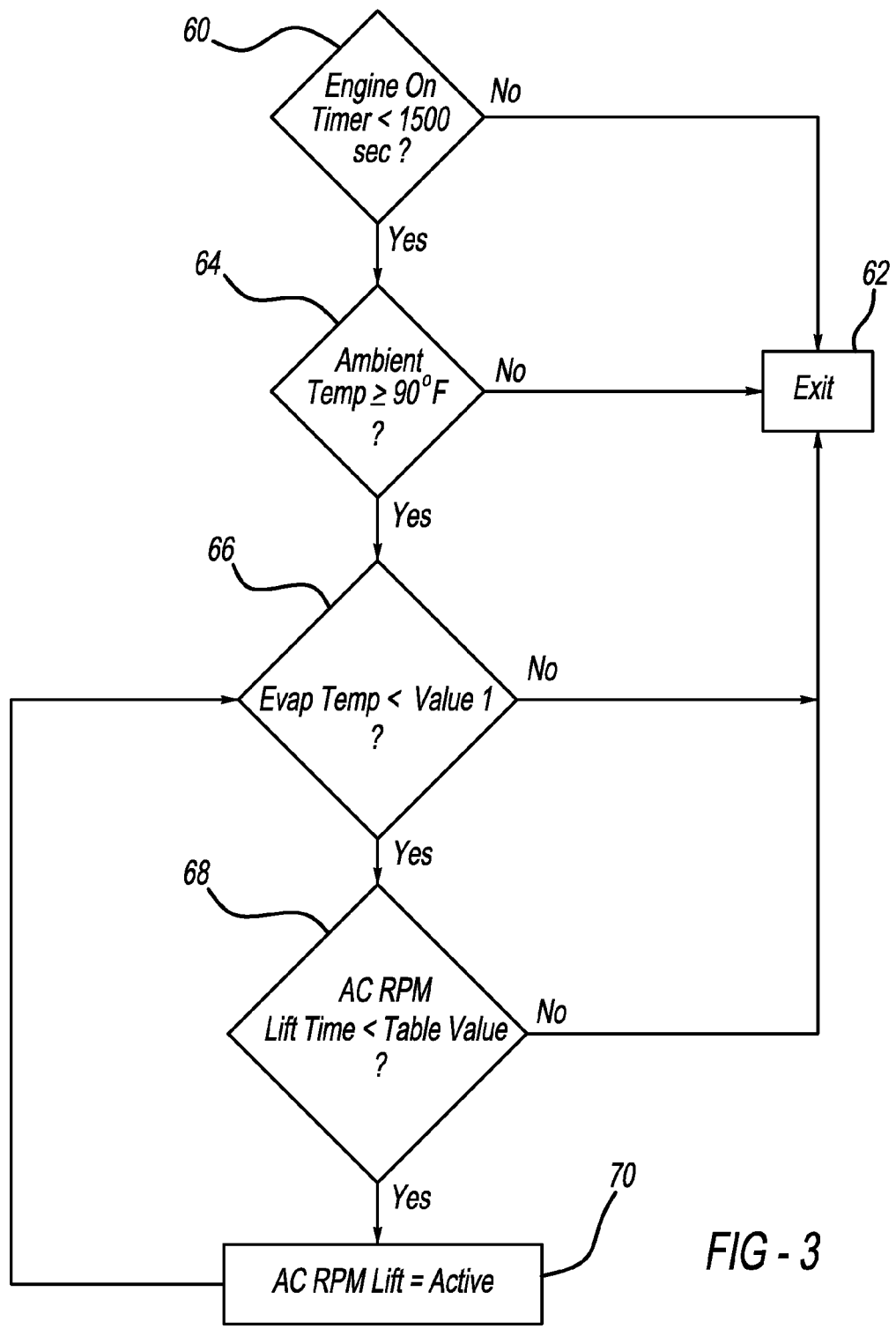
FIG. 3 is a flow chart illustrating operation of a system according to the disclosed inventive concept.

Particularly, and referring to FIG. 3, the methodology for regulating shift delay according to the disclosed inventive concept is disclosed. At step 60, an inquiry is made to the vehicle status sensor 28 to determine whether the engine assembly 14 is on or off based on a time of < 1500 seconds (other times may be employed). If, upon inquiry, it is determined that the engine assembly 14 is off then the program is exited at step 62.

If upon inquiry at step 60 it is determined that the engine assembly 14 is on then the program proceeds to the next inquiry at step 64 as to whether or not the ambient temperature is ≥90° F. As with the prior art discussed above, this determination is made using the ambient temperature sensor 26. If it is found at step 64 that the ambient temperature is not ≥90° F. at step 64 then the program is exited at step 62.

On the other hand, if it is found after signaling the ambient temperature sensor 26 at step 64 that the ambient temperature is ≥90° F. then an inquiry is made of the compressor RPM sensor 34 at step 66 whether or not a temperature selected from one or more of the HVAC evaporator temperature (via the HVAC evaporator temperature sensor 30), the HVAC discharge temperature (via the HVAC discharge temperature sensor 32) or the cabin temperature (via the cabin temperature sensor 24) is < than a predetermined temperature value 1. If it is found that the preferred temperature is not < the predetermined temperature value 1, then the program is exited at step 62.

If at step 66 it is found that the preferred temperature is < the predetermined temperature value 1, then an inquiry is made at step 68 whether or not the air conditioner compressor RPM lift time is < a predetermined value of a look-up table. If at determination is made at step 68 that the air conditioner compressor RPM lift time is not < the predetermined value of a look-up table at step 68 then the program is exited at step 62.

Conversely, if it is found at step 68 that the air conditioner compressor RPM lift time is < the predetermined value of the look-up table then the air conditioner compressor RPM lift is made active and the shift delay is cancelled at step 70. The inquiry at step 68 is thereafter repeated until it is determined that the air conditioner compressor RPM lift time is not < the predetermined value of a look-up table at which time the program is exited at step 62.

The disclosed inventive concept as set forth above overcomes the challenges faced by systems for optimizing delays in gear shifting. The system and methodology disclosed above improve vehicle passenger comfort while increasing fuel economy. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A system for transmission shift delay in a vehicle comprising:
   an engine;
   a transmission connected to said engine;
   a control module;
   a shift controller connected to said transmission and to said module for regulating delayed shifting of said transmission;
   a temperature sensor for sensing a temperature, said sensor connected to said module, whereby said module cancels delayed shifting when a pre-selected temperature is sensed by said sensor,
   wherein said temperature sensor is selected from the group consisting of:
   (a) an in-vehicle cabin temperature sensor;
   (b) an HVAC evaporator temperature sensor; and
   (c) an HVAC discharge temperature sensor.

2. The system for transmission shift delay in a vehicle of claim 1 wherein said shift controller regulates upshifting.

3. The system for transmission shift delay in a vehicle of claim 1 wherein said temperature sensor is an in-vehicle cabin temperature sensor.

4. The system for transmission shift delay in a vehicle of claim 1 wherein said temperature sensor is an HVAC evaporator temperature sensor.

5. The system for transmission shift delay in a vehicle of claim 1 wherein said temperature sensor is an HVAC discharge temperature sensor.

6. The system for transmission shift delay in a vehicle of claim 1 further including a vehicle status sensor for determining if the vehicle is on or off.

7. The system for transmission shift delay in a vehicle of claim 1 further including an ambient air temperature sensor.

8. The system for transmission shift delay in a vehicle of claim 1 further including an air conditioner compressor, said air conditioner compressor having a sensor for determining revolutions per minute.

9. A system for transmission shift delay in a vehicle comprising:
   an engine;
   a transmission connected to said engine;
   a shift controller connected to said transmission for effecting delayed shifting and upshifting;
   a temperature sensor for sensing a temperature;
   a control module connected to said controller and said sensor for regulating shifting based on a sensed temperature,
   wherein said temperature sensor is selected from the group consisting of:
   (a) an in-vehicle cabin temperature sensor;
   (b) an HVAC evaporator temperature sensor; and
   (c) an HVAC discharge temperature sensor.

10. The system for transmission shift delay in a vehicle of claim 9 wherein said temperature sensor is an in-vehicle cabin temperature sensor.

11. The system for transmission shift delay in a vehicle of claim 9 wherein said temperature sensor is an HVAC evaporator temperature sensor.

12. The system for transmission shift delay in a vehicle of claim 9 wherein said temperature sensor is an HVAC discharge temperature sensor.

13. The system for transmission shift delay in a vehicle of claim 9 further including a vehicle status sensor for determining if the vehicle is on or off.

14. The system for transmission shift delay in a vehicle of claim 9 further including an ambient air temperature sensor.

15. The system for transmission shift delay in a vehicle of claim 9 further including an air conditioner compressor, said air conditioner compressor having a sensor for determining revolutions per minute.

16. A system for transmission shift delay in a vehicle comprising:
   an engine;
   a transmission connected to said engine;
   a control module;
   a shift controller connected to said transmission and to said module for regulating delayed shifting of said transmission;
   a temperature sensor for sensing a temperature associated with a climate control air conditioning comfort target, said sensor connected to said module, whereby said module cancels delayed shifting when a pre-selected temperature is sensed by said sensor.

17. The system for transmission shift delay in a vehicle of claim 16 wherein said shift controller regulates upshifting.

18. The system for transmission shift delay in a vehicle of claim 16 wherein said temperature sensor is an in-vehicle cabin temperature sensor.

19. The system for transmission shift delay in a vehicle of claim 16 wherein said temperature sensor is an HVAC evaporator temperature sensor.

20. The system for transmission shift delay in a vehicle of claim 16 wherein said temperature sensor is an HVAC discharge temperature sensor.

* * * * *